United States Patent [19]

Nicot

[11] Patent Number: 5,611,545
[45] Date of Patent: Mar. 18, 1997

[54] BEARING SEAL WITH INTEGRAL ENCODER, EQUIPPED WITH AN INFORMATION SENSOR

[75] Inventor: Christophe Nicot, Annecy, France

[73] Assignee: The Torrington Company, Torrington, Conn.

[21] Appl. No.: 456,998

[22] Filed: Jun. 1, 1995

[30] Foreign Application Priority Data

Feb. 3, 1995 [FR] France .................................. 95 01261

[51] Int. Cl.$^6$ .............................. F16J 15/32; F16C 33/76
[52] U.S. Cl. .................................. 277/2; 277/38; 277/152; 384/448; 324/207.25
[58] Field of Search ................................. 277/2, 38, 152, 277/153, 183; 384/448, 486; 324/173, 174, 207.25

[56] References Cited

U.S. PATENT DOCUMENTS

| | | | |
|---|---|---|---|
| 4,946,296 | 8/1990 | Olschewski et al. | 384/448 |
| 5,004,358 | 4/1991 | Varvello et al. | 384/448 |
| 5,011,303 | 4/1991 | Caron | 384/448 |
| 5,143,458 | 9/1992 | Alff et al. | 384/448 |
| 5,382,098 | 1/1995 | Rigaux et al. | 384/448 |
| 5,407,213 | 4/1995 | Ouchi et al. | 277/2 |
| 5,431,413 | 7/1995 | Hajzler | 277/2 |
| 5,451,869 | 9/1995 | Alff | 384/448 |
| 5,458,420 | 10/1995 | Otto | 277/2 |
| 5,470,157 | 11/1995 | Dougherty et al. | 384/448 |
| 5,476,272 | 12/1995 | Hixson, II | 277/2 |

*Primary Examiner*—Scott Cummings
*Attorney, Agent, or Firm*—John C. Bigler

[57] ABSTRACT

A seal for a rolling element bearing or rolling element bearing seat wherein a packing with sealing lips is in contact with two reinforcements to which the sensor and encoder are fastened. The reinforcements have a cylindrical mounting surface. One of the reinforcements is radially extended by a support surface and by a local radial extension for positioning and retaining for the sensor with respect to the encoder.

5 Claims, 3 Drawing Sheets

BEARING SEAL WITH INTEGRAL ENCODER, EQUIPPED WITH AN INFORMATION SENSOR

BACKGROUND OF THE INVENTION

This invention relates generally to a seal with integral encoder equipped with an information sensor for use with a rolling element bearing or rolling element bearing seat. More particularly, the invention relates to a seal wherein a packing with sealing lips are in contact with two reinforcements to which the sensor and encoder are fastened.

A predefined type of seal in which a sensor element is fastened by hooking it to one of the reinforcements is known from FR-A-2640706 and 2642483.

According to U.S. Pat. No. 5,431,413, a sensor element is positioned before an encoding element via an adjustable support linking the mounting guides of the sensor element with a locking means for the sensor element.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a seal with integral encoder equipped with an information sensor for use with rolling element bearings or rolling element bearing seats. Two reinforcements to which the sensor and encoder are fastened have a cylindrical mounting surface. One of the reinforcements is radially extended by a support surface and by means for positioning and retaining the sensor with respect to the encoder. A packing with sealing lips is in contact with the two reinforcements.

The foregoing and other aspects will become apparent from the following detailed description of the invention when considered in conjunction with the accompanying drawing digures.

BRIEF DESCRIPTION OF THE DRAWING FIGURES

DETAILED DESCRIPTION

Figure 1:
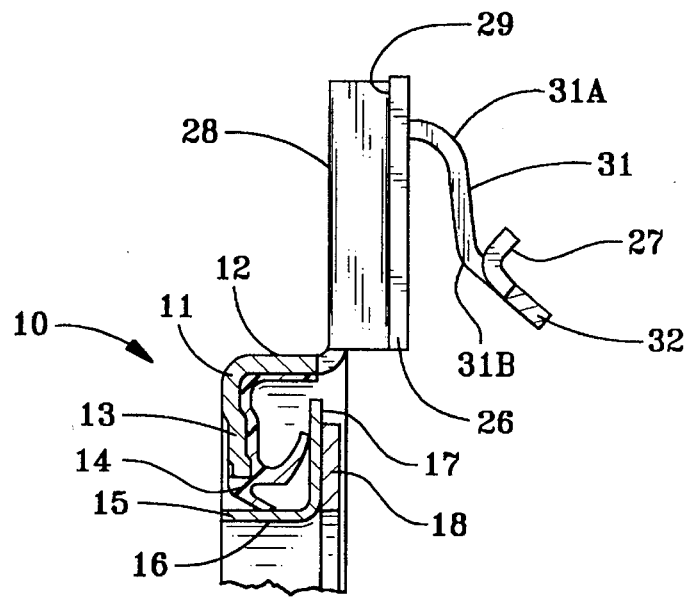
FIG. 1 is a radial cross section along line 1-1 of FIG. 2 illustrating an embodiment of the seal with integral encoder of the present invention.
Figure 2:
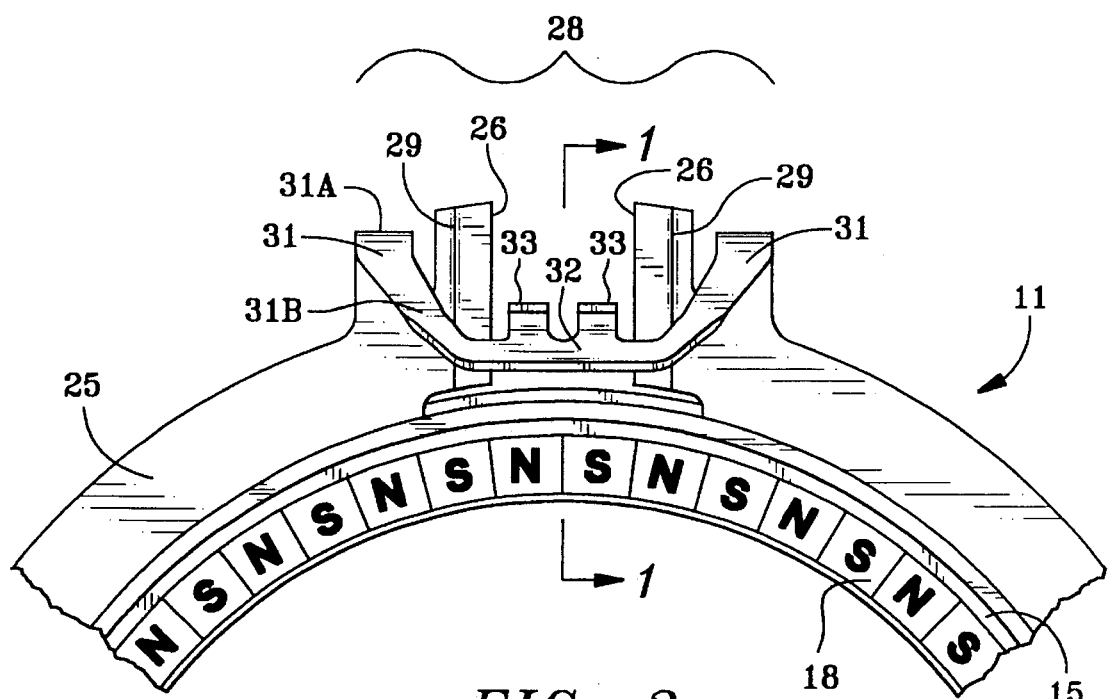
FIG. 2 is a front elevation of a section of the seal with integral encoder shown in FIG. 1, together with bearing positioning and locking means for the sensor element.

According to FIGS. 1 and 2, seal 10 is made up of an outer reinforcement 11 and an inner reinforcement 15, the term "outer" referring to the reinforcement provided with an outer cylindrical mounting surface 12 and the term "inner" referring to the reinforcement 15 provided with an inner cylindrical mounting surface 16. The reinforcement 11 is formed, in a manner well-known to the expert, of a radial disk 13 fastened to the rolling element bearing seat 12. Similarly, the reinforcement 15 is formed of a radial disk 17 fastened to the rolling element bearing seat 16.

One face of the disk 17 is covered by an elastomer charged with magnetic particles whose distribution along the circumference represents several N-S poles, as shown in FIG. 2. The set of N-S poles forms an encoder 18. The inner face of the disk 17 and the outer surface of the seat 16 are tightly sealed with the axial and radial lips of a packing 14 molded onto the reinforcement 11.

Figures 3, 4:
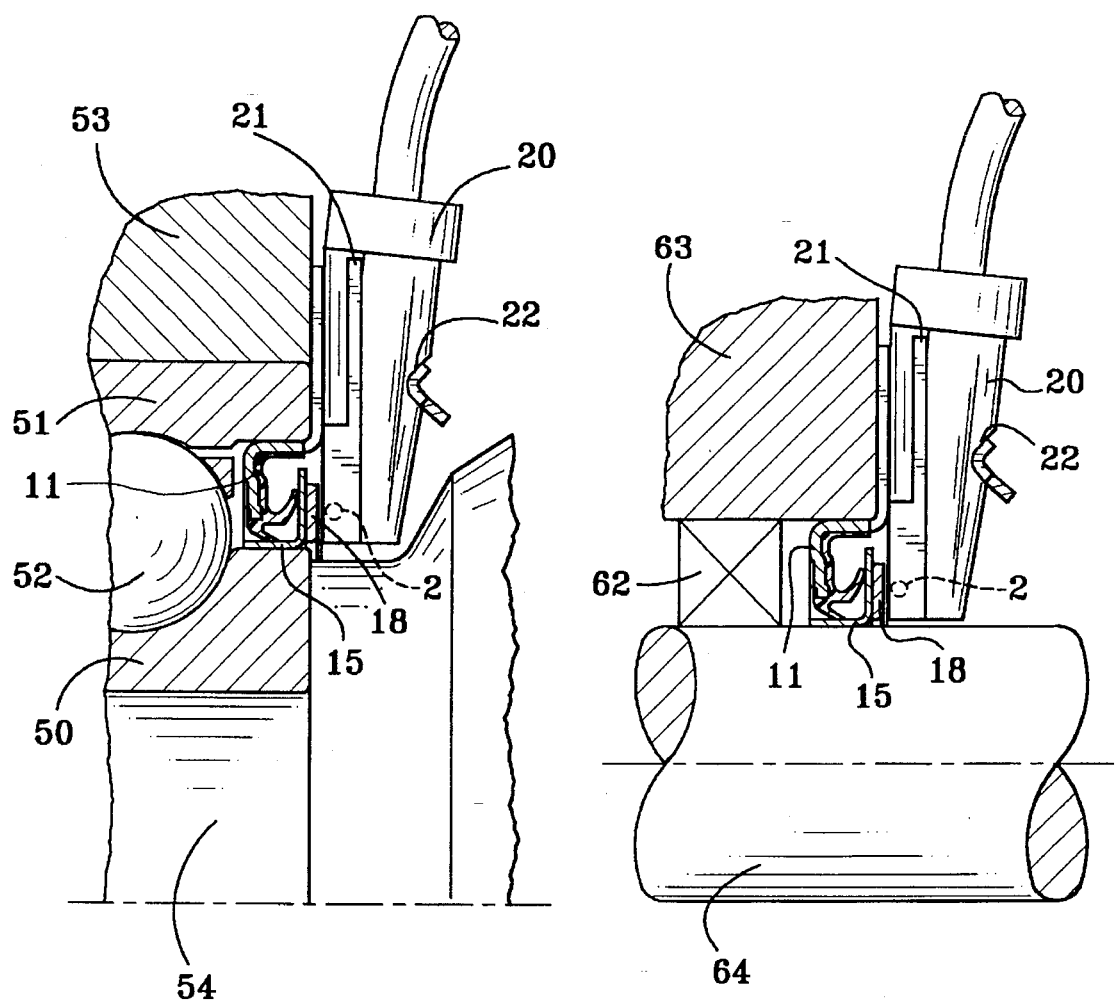
FIG. 3 is a radial cross section of a mounting between two exterior and interior rings of a rolling element bearing, including the seal with integral encoder shown in FIG. 1 equipped with an information sensor element.
FIG. 4 is a radial cross section of a mounting on a rotary shaft of the seal with integral encoder shown in FIG. 1 equipped with an information sensor element.
Figure 5:
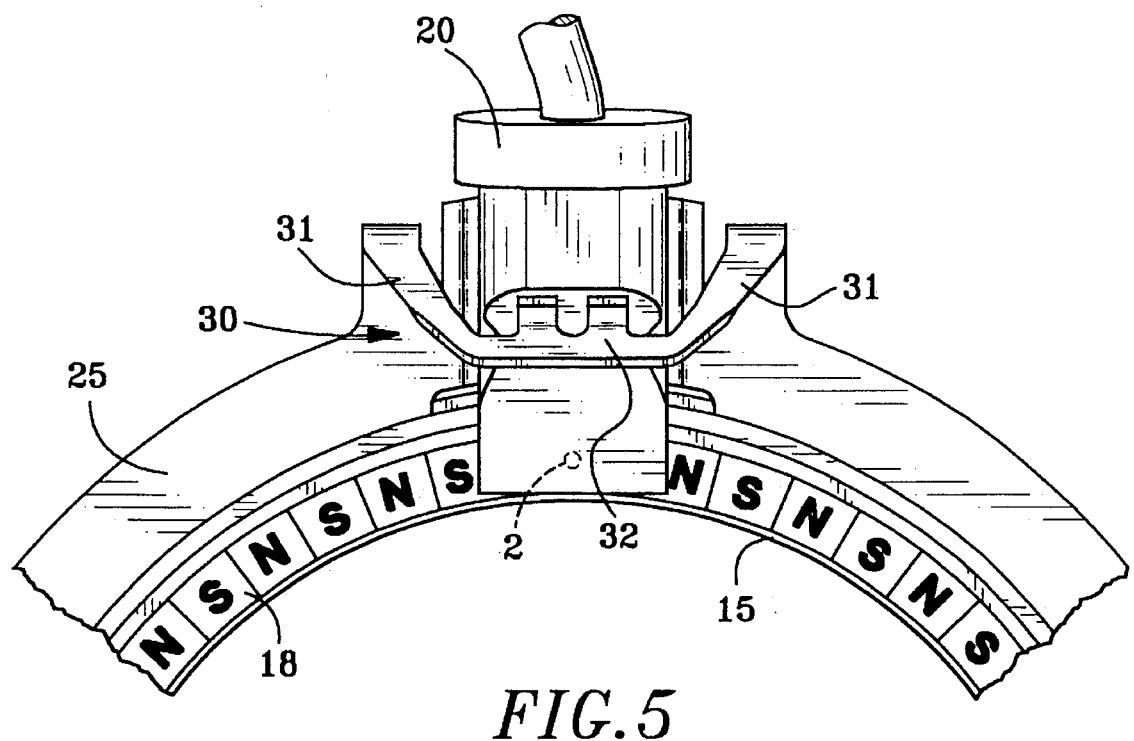
FIG. 5 is a front elevation of the mounting of the sensor element on the seal shown in FIG. 2.

A sensor element 2 depicted in FIGS. 3 through 5 is supported by an attachment head 20 whose sides bear mounting grooves 21. The face of the attachment head 20, opposite to the reading face, bears a transverse groove 22 that cooperates with a means for locking and positioning the attachment head 20 on a support means.

Figure 6:
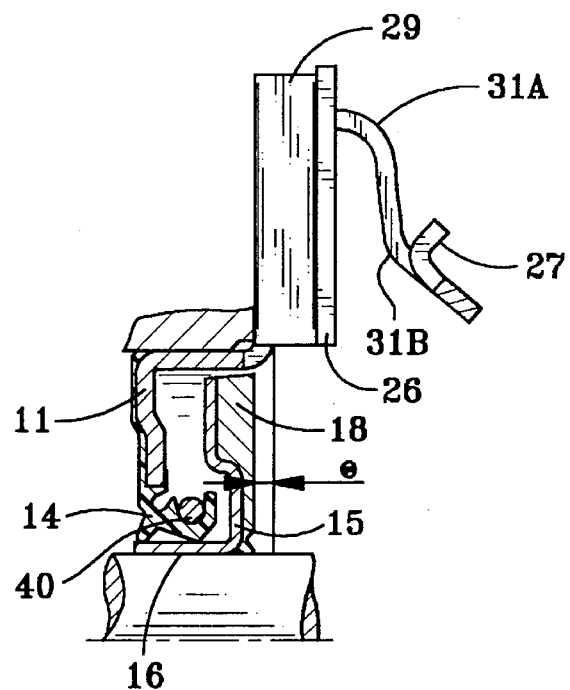
FIG. 6 is a radial cross section illustrating an alternative embodiment of the seal with integral encoder of the present invention, equipped with positioning and locking means for the sensor element.

According to the invention, the reinforcement 11 is extended radially by an annular bearing surface 25 connected to the outer mounting surface 12. As shown in FIGS. 1, 4 and 6, the support surface 25 extends locally by a positioning guide 26 which may be engaged in the mounting grooves 21 of the attachment head 20 for the sensor element 2.

The positioning guide 26 and an elastic retaining means 27 are obtained by cutting out and locally folding the support surface 25 and local radial extension 28 of said surface. The positioning guides 26 are made up of opposing sliding edges cut out by punching into the extension 28 of the support surface 25, which is respectively connected to two opposing functional folds 29.

The retaining means 27 is made up of a stirrup 30 whose bent elastic legs 31 are connected to a locking segment 32 and extend respectively between two folds 31A, 31B located on the outer edge of the extension 28 of the bearing surface 25 and on the junction of the segment 32 with the corresponding leg 31. The elastic legs 31, braced by segment 32, have a gradually increasing section between the folds 31A and 31B as a function of the thickness of the reinforcement 11 and the alloy of which said reinforcement is made.

FIGS. 3, 4 and 5 illustrate the mounting for positioning and locking the attachment head 20 of the sensor element in contact with the reinforcement 11. In order to perfect the radial positioning of the attachment head 20 with respect to the retaining means 27, the locking segment 32 has one or two positioning lugs 33 that come into contact with the transverse groove 22 of the attachment head 20 of the sensor element.

The aforementioned mountings of FIGS. 3 and 4 also show that the support surface 25 forms an axial spacer for the sensor element 2 with respect to the encoder 18 which makes it possible to protect the encoding elements from accidental contact with the attachment head 20 by clearance $\Theta$.

FIG. 6 describes an alternative embodiment of the seal in which the reinforcement 11 bears a sealing packing with radial lips 14 in contact with the outer support surface 16 of the reinforcement 15 under the action of a pretensioned spring 40.

FIGS. 3 and 4 respectively describe the mountings for applying the seal to a rolling element bearing and to a rolling element bearing seat. According to FIG. 3, the seal is installed between the rotating inner ring 50 and the fixed outer ring 51 of a rolling element bearing 52 mounted in the seat of a fixed casing 53 and whose inner ring 50 is driven, for example, by the tail 54 of a transmission joint.

According to FIG. 4, the seal is mounted between a rotary shaft 64 and the housing of casing 63 outside a support journal bearing 62 of the shaft 64.

Without deviating from the scope of the invention, it is of course possible to apply the aforementioned constructive measures to other known seals, for example, by U.S. Pat. No. 5,451,869.

The invention provides an important constructive simplification of seals, according to which the seal bears an axial positioning means with respect to a side face of the seat or rolling element bearing and a radial locking means for said sensor element.

According to the invention, the supporting reinforcement of the sensor element extends radially by a support surface attached to a side bearing surface. One of the reinforcements is extended radially by a support surface and by a positioning and retaining means for the sensor element with respect to the encoder element.

The seal thus formed has the advantage of eliminating the adjustment of the support and retaining means for the sensor element and the attachment of said means to the corresponding component of the rolling element bearing or rolling element bearing seat. The seal may be fitted on any type of rolling element bearing with minimal modification of its bearing race.

The rolling element bearing equipped with a seal according to the invention has standard dimensional characteristics and can be mounted for use without previous modification of the dimensional characteristics of the support casings of the bearing. The risks of displacement of the bearing in its seat generated during operation are thereby eliminated.

Having described the invention, what is claimed is:

1. A seal with integral encoder equipped with an information sensor, for use with rolling element bearings comprising:

first and second reinforcements to which the sensor and encoder are fastened, respectively, said first and second reinforcements each having a cylindrical mounting surface, said first reinforcement being radially extended by a support surface and by means for positioning and retaining the sensor with respect to the encoder, wherein the cylindrical mounting surface of said first reinforcement is radially extended by an annular support surface and said support surface extends locally forming a guide that positions the sensor and an elastic means defined by two bent elastic legs connected by a locking segment for retaining the sensor element in said guide; and a packing with sealing lips in contact with the two reinforcements.

2. The seal according to claims 1, wherein the guide for positioning the sensor and the elastic means are partially cut out in the support surface and in the local extension of said support surface.

3. The seal according to claim 2, wherein the guide means is defined by sliding edges of the local extension formed between the two elastic legs.

4. The seal according to claim 1, wherein the elastic legs of the elastic means extend respectively between an outer edge of the local extension of the support surface of the reinforcement and a junction of the locking segment with the corresponding elastic leg.

5. A seal with integral encoder equipped with an information sensor, for use with rolling element bearings, comprising:

first and second reinforcements to which the sensor and encoder are fastened, respectively, said first and second reinforcements each having a cylindrical mounting surface, said first reinforcement being radially extended by an annular support surface that extends locally as a guide defined by sliding edges formed by folding a portion of the local extension and as an elastic means defined by two bent elastic legs connected by a locking segment for the sensor, for retaining the sensor element in said guide, the guide and the elastic means being partially cut out in the support surface and the local extension of the support surface, the elastic legs extending between two folds located on the outer edge of the local extension of the support surface of the reinforcement and a junction of the locking segment with the corresponding elastic leg and have a gradually decreasing section between said folds; and a packing with sealing lips in contact with the two reinforcements.

* * * * *